United States Patent [19]

Keskkula et al.

[11] Patent Number: 4,508,871
[45] Date of Patent: Apr. 2, 1985

[54] TRANSPARENT BLENDS OF POLYMETHYLMETHACRYLATE AND CERTAIN STYRENE COPOLYMERS

[75] Inventors: Henno Keskkula, Austin, Tex.; Kathleen M. McCreedy; Donald A. Maass, both of Midland, Mich.

[73] Assignee: The Dow Chemical Company, Midland, Mich.

[21] Appl. No.: 470,419

[22] Filed: Feb. 28, 1983

Related U.S. Application Data

[63] Continuation-in-part of Ser. No. 255,957, Apr. 20, 1981, abandoned.

[51] Int. Cl.$^3$ ............................ C08L 33/10; C08L 51/00
[52] U.S. Cl. .................................... 525/78; 525/83; 525/84; 525/214; 525/221; 525/222
[58] Field of Search ................... 525/78, 83, 84, 221, 525/214, 222

[56] References Cited

U.S. PATENT DOCUMENTS

| | | | |
|---|---|---|---|
| 3,170,964 | 2/1965 | Grabowski | 525/71 |
| 3,177,268 | 4/1965 | Frazer | 525/84 |
| 3,502,604 | 5/1970 | Nakatsuka | 525/221 |
| 4,302,378 | 11/1981 | Lindner | 525/83 |

*Primary Examiner*—Jacob Ziegler
*Attorney, Agent, or Firm*—R. B. Ingraham

[57] ABSTRACT

Innately-transparent, polymethylmethacrylate polyblends, and transparent shaped articles therefrom fabricated, are comprised with components therein of:
(a) polymethylmethacrylate; and
(b) at least one copolymer of styrene (and/or equivalent vinyl aromatic monomers) with one or more of certain vinyl acids; plus and optionally or as an alternative;
(c) at least one mass-made acrylonitrile-butadiene-styrene or acrylonitrile-butadiene-styrene-type resin in addition to or in replacement of and substitution for said component (b).

14 Claims, 7 Drawing Figures

Figure 3
Domain Structure in SAN-PMMA Blends[1]
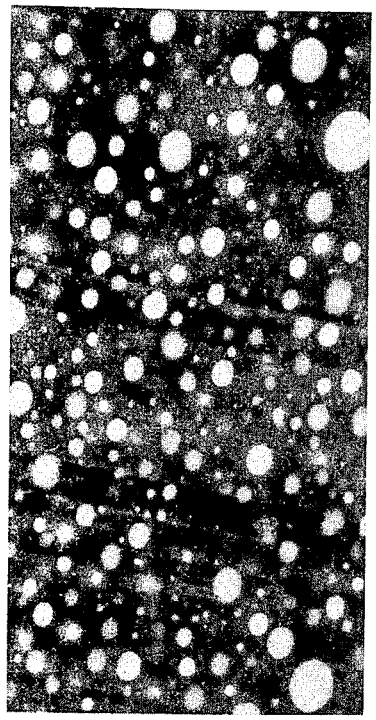
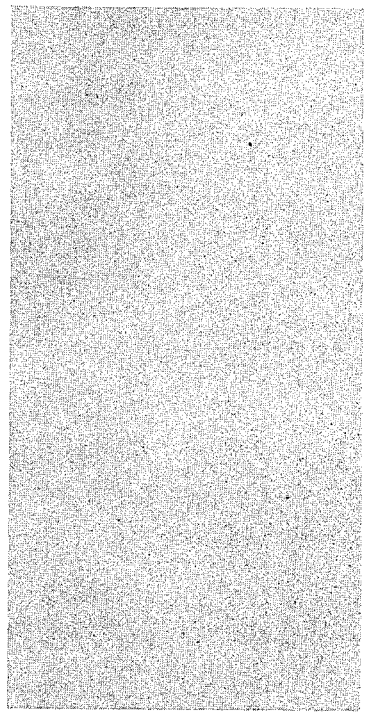
|1μm|
(a) Incompatible PMMA-
 -SAN (34.1% AN) Blend
(b) Compatible PMMA-
 -SAN (24.0% AN) Blend
[1] 75-25 SAN-PMMA ratio; transmission electron microscopy of ultrathin sections

Figure 5
Transmission Electron Microscopy of Ultrathin Sections of XP – PMMA Blends
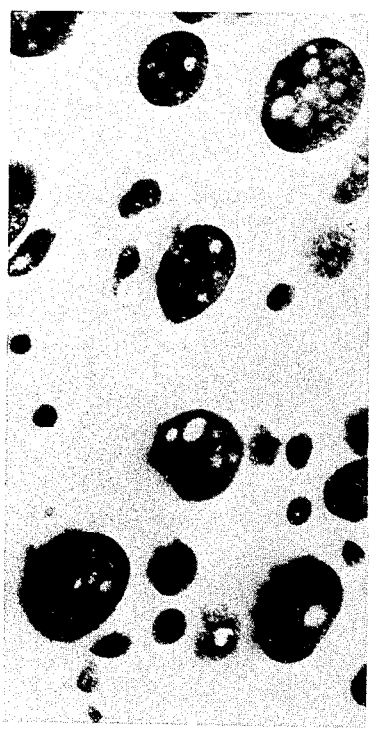
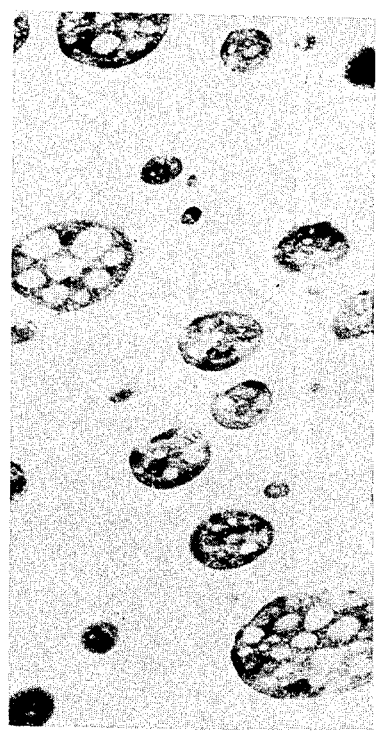
1 μm
(a) XP
(b) XP / Lucite 140 (67/33)

Figure 6

Transparency of ABS 500 — PMMA Blends

| ABS 500, % | 100 | 81.5 | 63.0 | 44.4 | 25.9 |
| --- | --- | --- | --- | --- | --- |
| PMMA, % | — | 18.5 | 37.0 | 55.6 | 74.1 |

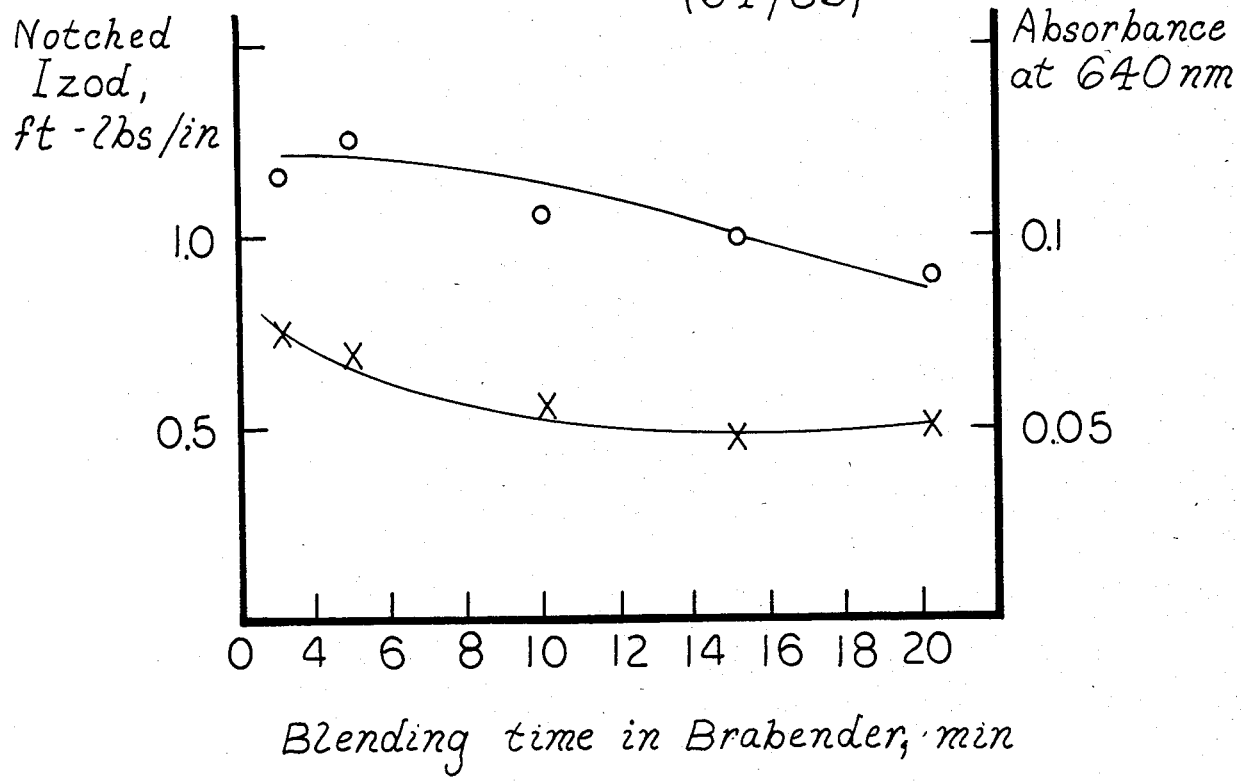

TRANSPARENT BLENDS OF POLYMETHYLMETHACRYLATE AND CERTAIN STYRENE COPOLYMERS

CROSS-REFERENCE TO RELATED APPLICATION

This application is a continuation-in-part of the copending application Ser. No. 255,957, filed Apr. 20, 1981, now abandoned.

BACKGROUND OF THE INVENTION

It is well known that various synthetic resinous materials are generally incompatible. Because of this, physical admixtures of most given different polymers such as those obtained from melt blending usually give opaque blended products. The theory and practice of polymer compatibility and blending is documented in "Polymer Blends", Vols. 1 and 2, by D. R. Paul and Seymour Newman, Academic Press Publishers of New York, San Francisco and London (1978).

There is an obvious need for desirable transparent polymer products for various applications including packaging purposes. Oftentimes there is need for better properties in materials desired to be utilized than are available in many of the known normally-transparent polymer products. Property modification is frequently desirable for many intended uses of transparent polymeric goods. Such properties as: improved heat deformation temperature characteristics better adhesion; improved light stability; and the like are advantageous.

It is frequently difficult to have all desired physical features in any single polymer material; such shortcomings of individual polymer species being commonly aggravated by the various requirements for polymer for various applications. Polymer blends are notoriously incompatible and not transparent in nature.

It is known that transparent polymer blends may be obtained if the refractive index of each of the component polymers are matched within about ±0.005 refractive index units. This is disclosed in U.S. Pat. No. 4,083,896. A similar result is often obtained when the component polymers are thermodynamically compatible. Polymethylmethacrylate and various styrene/acrylonitrile copolymers generally those containing between about 8 and about 28 percent by weight of copolymerized acrylonitrile have different refractive index values, form transparent polyblends; this presumably being due to the basic compatibility of the involved polymer species. French Pat. No. 1,526,375 is indicative of this.

Nothing in prior art reliably directs the successful realization of other advantageous transparent polyblends involving mixtures of polymethylmethacrylate and copolymeric styrene materials in order to get better and more satisfactory products therewith as in the present contribution to the art.

FIELD OF THE INVENTION

The instant contribution to the art pertains to remarkably transparent polyblends of polymethylmethacrylate and certain alkenyl aromatic copolymers with vinyl aromatic acids having desirable physical properties. Such polyblends may incorporate minor proportions of other compatible polymers.

SUMMARY OF THE INVENTION

The present invention is a polyblend of organic thermoplastic polymeric composition, transparent to the unaided human eye, said composition having a light absorbance value in the 640 nanometer wave length that is not greater than about 0.12 when said composition in a solid, shaped specimen form that has an at least generally uniform thickness which approximates 10 mils is disposed and exposed perpendicularly to the path of a ray of said 640 nanometer wavelength light from a source thereof, said composition comprising, in intimate, physically interdispersed admixture:

(a) polymethylmethacrylate in an effective quantity as a component in said polyblend composition; and (b) from 0 to about 99 weight percent and beneficially from 1 to 99 weight percent, based on total weight of the composition of a copolymer of an alkenyl aromatic monomer and a monomeric vinyl acid containing polymerized in the copolymer molecule between about 95 and about 50 weight percent of the alkenyl aromatic monomer, said alkenyl aromatic monomer being of the formula:

wherein G is selected from the Group consisting of hydrogen and methyl and Ar is an aromatic radical of from 6 to about 10 carbon atoms, said vinyl acid monomer being acrylic acid, methacrylic acid, itaconic acid and mixtures thereof; and (c) from 0 to 70 weight percent of a massmade ABS-type resin that comprises:

from about 20 to about 35 parts by weight of a cyanoalkene of the Formula:

wherein R is selected from the Group consisting of hydrogen and a lower alkyl unit containing not more than about 4 carbon atoms therein;

from about 86 to about 72 parts by weight of an alkenyl aromatic monomer of the Formula (I); and between about 5 and about 18 weight percent of a natural or synthetic rubber ingredient;

with the limitation that:

(i) when there is no quantity of component (c) in the polyblended composition, the weight percent of said component (b) therein present is at least about 1;

(ii) when there is no quantity of component (b) in the polyblended composition, the weight percent of said component (c) therein present is at least about 20; and (iii) when both said component (b) and component (c) are present in the polyblended composition, the weight percent of said component (b) therein present is at least about 1 and the weight percent of said component (c) therein present is at least about 20.

Also contemplated within the scope of the present invention are transparent shaped articles of the hereinbefore-described polyblend.

DETAILED DESCRIPTION OF THE INVENTION

Figure 1:
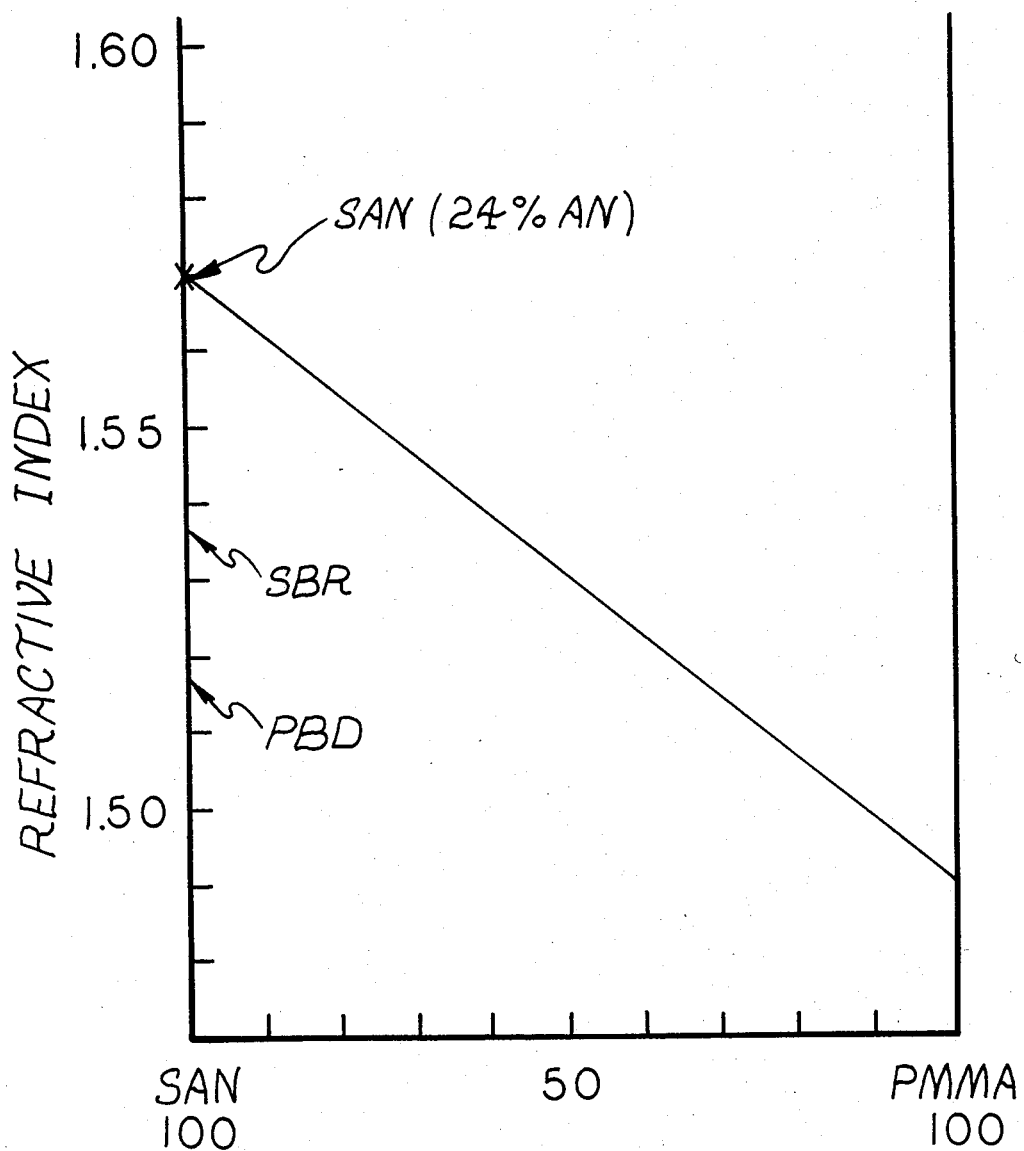

The present invention involves physically-improved and transparent polyblends, wherein the essential components are (a) polymethylmethacrylate; and (b) at least one copolymer of vinyl aromatic monomer with one or more of certain vinyl acids or acrylonitrile; plus and optionally or as an alternative (c) at least one mass-made acrylonitrile-butadiene-styrene-type resin in addition to or in replacement of and substitution for said component (b).

It is generally advantageous for the polyblend, especially when it essentially is a components (a) and (b) composition, to contain at least about one percent by weight based on total composition weight of either component (a) or component (b). It is usually more beneficial, however, for the polymethylmethacrylate component (a) to be present in the polyblend in an amount of at least 10 and preferably at least about 20 or more weight percent. The higher component (a) range, which for practical purposes may be as great as or in excess of 40 or 50 weight percent, is particularly suitable when the polyblend involves some acrylonitrile-butadiene-styrene-type component (c) in combination with a copolymeric component (b) or when a component (c) inclusion is utilized to the exclusion and in the acrylonitrile-butadiene-styrene of any component (b).

When transparent polyblends in accordance with the present invention are essentially mixtures of (a) and (c), it is usually advantageous to have in the composition a content of between about 20 and about 70 weight percent of the acrylonitrile-butadiene-styrene component (c).

The foregoing composition generalities apply even when one or more additional and different compatible polymeric additaments are included in the polyblend composition other than component (c).

When a third compatible polymeric additament, other than component (c) material, is employed in a polyblend product in accordance with the invention, it is usually preferable to maintain the content of same at a level which is not in excess of about 20 weight percent. More advantageously, this content is desirable when at the 10 weight percent, or less, level.

The actual transparency of any given multicomponent polymeric system is achieved when the minor component of the involved polyblend wherein the given ingredients have different refractive indexes is dispersed such that its domain sizes are well below the wave length of light which, roughly, is about one-tenth (0.1) of a micron. It appears that both polymethylmethacrylate and copolymers of styrene and acrylic acid are quite readily dispersible into sub-micron domains. Also, consideration must be maintained of the fact evident in the above-noted U.S. Pat. No. 4,083,896 that it is generally appreciably more difficult to blend diverse polymers having greatly different melt viscosities.

It is surprising that excellent polyblend products in accordance with the present invention of polymethylmethacrylate with such alkenyl aromatic/vinyl acid copolymers as styrene-acrylonitrile and/or styrene acrylic acid are readily obtained even if large melt viscosity differences exist between the polyblend components.

It is also surprising that in the practice of the present invention a mixture of two generally incompatible styrene copolymers, such as styrene-acrylonitrile containing about 28 percent by weight in the interpolymerized composition of copolymerized acrylonitrile and a styrene acrylic acid containing about 7.5 percent by weight of copolymerized acrylic acid can be rendered compatible and transparent by the addition of as little as 10 to 20 weight percent of polymethylmethacrylate.

Even more surprising and unexpected in practice of the present invention when a component (c) is utilized is the discovery that certain of the so-called "mass-made" acrylonitrile-butadiene-styrene-type resins are observed to be rendered transparent upon being blended with polymethylmethacrylate.

Acrylonitrile-butadiene-styrene and like type resins are plastics which have been known for many years. They are well characterized in such sources as "ABS Plastics" by Costas H. Basdekis, published in 1964 as part of its *Plastics Application Series* by Reinhold Publishing Corporation of New York. They are generally tough materials having good solvent- and impact-resistant qualities.

In the mass technique for acrylonitrile-butadiene-styrene manufacture, the rubber, such as polybutadiene is directly dissolved in a mixture of styrene and acrylonitrile followed by polymerization of the mass under the influence of agitation which is continued at least until the occurrence of the rubber phase inversion, continuing polymerization either in mass or in a suitable suspension of the mass to a desired degree of conversion. On devolatilization, the desired acrylonitrile-butadiene-styrene plastic product is obtained for utilization as component (c).

Other conventional preparations of acrylonitrile-butadiene-styrene resins involve such procedures as: (i) blending any one or more of various suitable rubber latices with a styrene-acrylonitrile resin; and (ii) polymerizing styrene and acrylonitrile in the presence of a preformed rubber in latex form.

Acrylonitrile-butadiene-styrene and like type component (c) resins prepared by the mass-made technique are typically characterizable by the relatively large size of the rubber particles therein which are usually in the weight average diameter range of from about 0.3 micron and often from about 0.5 to about 5 microns. These complex rubber particles generally have a rubber phase containing occluded styrene-acrylonitrile polymer and are of a size that is well above that which will cause light scattering.

In accordance with the present invention polyblends of polymethylmethacrylate with mass-made acrylonitrile-butadiene-styrene resins are satisfactorily transparent, many corresponding blends of polymethylmethacrylate with emulsion-made acrylonitrile-butadiene-styrene resins do not provide transparent compositions but, as would be expected, remain opaque.

The mass-made acrylonitrile-butadiene-styrene resins, when employed as component (c) in practice of the present invention, may be admixed solely with the polymethylmethacrylate component (a) or, if preferred, with beginning or finally-resulting (depending on addition order of constituents) mixtures of components (a) and (b).

These mass-made acrylonitrile-butadiene-styrene resins can be satisfactorily obtained, for example, generally as taught in U.S. Pat. No. 3,627,855. They usually contain copolymerized therein from about 14 to 28 parts by weight acrylonitrile and from about 86 to 72 parts by weight of styrene with between about 5 and about 18 percent by weight of butadiene polymer.

Equivalent mass-made acrylonitrile-butadiene-styrene-type resins for present purposes can be prepared with component variations in place of or in admixture with the respective acrylonitrile, styrene and butadiene polymer ingredients.

For the acrylonitrile-butadiene-styrene type resin, other cyanoalkylenes may be utilized along with or in place of acrylonitrile, such as α-methacrylonitrile, of the Formula:

  (III)

wherein R is selected from the Group consisting of hydrogen and lower alkyl units containing not more than 4 carbon atoms.

Butadiene polymer is oftentimes preferred as the elastomeric or rubbery substrate component for the mass-made component (c) acrylonitrile-butadiene-styrene resins suitable for polyblends in accordance with the present invention.

The elastomer utilized in preparation of such acrylonitrile-butadiene-styrene resins may also be selected from a wide variety of generally sulfurvulcanizable materials or mixtures thereof additional to polybutadiene. It can be natural rubber, a conjugated diolefin homopolymer synthetic rubber (or elastomeric polymer composition of between about 25 and 90 weight percent) of a 1,3-diene of the Formula:

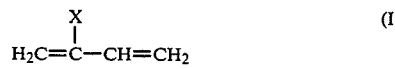  (IV)

wherein X is selected from the group consisting of hydrogen, chlorine and methyl radicals.

Such conjugated diolefin polymer synthetic rubbers are polymers of: butadiene-1,3; isoprene; 2,3-dimethyl-butadiene-1,3; and copolymers of mixtures of one or more such butadienes in a proportion of at least about 75 weight percent of such butadienes and, for example, of up to 25 weight percent of the entire copolymerizable mass in such mixture of one or more monoethylenic compounds which contain a

  (IVA)

group, wherein at least one of the connected R₁ and/or R₂ valences is attached to an electronegative group, that is, a group which substantially increases the electrical dissymmetry or polar character of the molecule.

Examples of compounds which contain the Formula (IVA) grouping and are copolymerizable with butadienes are: the following Formula (I) monomers, especially styrene; the unsaturated carboxylic acids and their esters, nitriles and amides, such as acrylic acid, methyl acrylate, ethyl acrylate, methyl methacrylate, acrylonitrile, α-methacrylonitrile, methacrylamide; vinylpyridines, such as 2-vinylpyridine, 2-methyl-5-vinylpyridine; methyl vinyl ketone, and methyl isopropenyl ketone—all of which besides those hereinbefore mentioned along with other vinyl acid monomers suitable for preparation of component (b), as also hereinafter disclosed are also copolymerizable with styrene.

Examples of such conjugated diolefin polymer synthetic rubbers are: polybutadiene; polyisoprene; butadiene-styrene copolymers; and butadiene-acrylonitrile copolymers. The synthetic rubber may be solution-prepared or emulsion-prepared, be it a stereo-specific variety or otherwise.

Other conventional unsaturated sulfur-vulcanizable rubbers may also be used as the elastomeric substrate material for the acrylonitrile-butadiene-styrene type resins, such as a rubbery terpolymer of ethylene, propylene and a copolymerizable non-conjugated diene, such as 1,4-hexadiene, dicyclopentadiene, dicyclooctadine, methylenenorbornene, ethylidenenorbornene, tetrahydroindene, and the like. The analogous fluorocarbon, silicone and polysulfide rubbers may also be employed as an elastomer.

It is generally most advantageous to utilize styrene for preparation of the component (b) copolymers, as well as in the mass-made component (c) acrylonitrile-butadiene-styrene type resins capable of being included in the transparent polyblends of the invention.

In addition to styrene and in place of or in mixture(s) therewith, other alkenyl aromatic monomers may be utilized. These are of the Formula:

  (I)

wherein G is selected from the Group consisting of hydrogen and methyl and Ar is an aromatic radical (including various alkyl and halo-ring-substituted aromatic units) of from 6 to about 10 carbon atoms. Such monomers, frequently quite satisfactorily, include: α-methylstyrene; vinyl toluene; vinyl naphthalene; the dimethyl styrene, t-butyl styrene; the several chlorostyrenes (such as the mono- and dichloro-variants); the several bromostyrenes (such as the mono- and dibromo-variants); and the like.

The vinyl acids that are employed for preparation of the component (b) copolymers are acrylic acid, methacrylic acid and itaconic acid.

Most advantageously, acrylic acid is the vinyl acid to utilize in provision of the component (b) copolymers. Yet, the dicarboxylic itaconic acid is also quite effective for the purpose, as is methacrylic acid.

The quantity of polymerized vinyl acid in the copolymeric component (b) compounds is advantageously between about 5 and about 50 weight percent, based on the weight of the resulting copolymer thereof with the identified alkenyl aromatic monomer(s) of the Formula (I), particularly styrene. More advantageously, not more than about 25 weight percent of acrylic acid or other vinyl acid monomer is copolymerized in the component (b) material.

To make the polyblends of the present invention, the desired appropriate proportions of components (a) and or (b) and/or (c) are generally physically admixed in such a way as will provide a generally homogenous blending thereof insofar as can be determined by the unaided eye. Most advantageously the polyblends are prepared by melt blending of the components by mechanical admixture thereof on or in intensive compounding apparatus such as extruders, masticating roll apparatus of the 2-roll and the like type, Banbury mixers, Brabender units, and the like, at a temperature adequate to heat plastify the components being mixed but less than that which would cause undesired polymer decomposition.

The polyblends pursuant to this invention can be provided with and contain other additaments that are oftentimes included in such compositions, such as, antioxidants, dyes, fillers both pulverulent, particulate or fibrous; stabilizers; mineral oil and other plasticizers; blowing agents; and the like.

As will be apparent to those skilled in the art, the physical properties and other characteristics of the present transparent polyblends depend, on both the particular types of components employed, presence or absence of various additives, and/or the acrylonitrile-butadiene-styrene resin utilized. Many designable product variation and possibilities, with differing advantageous end use capabilities are obtainable by component and composition selection pursuant to the instantly-disclosed practice.

EXEMPLIFICATION OF THE INVENTION

The invention is additionally demonstrated by the several graphical portrayals and photographic reproductions of the 7 figures in the accompanying Drawing which, are obtained from experiments.

In connection with the representations in certain of the figures in the Drawing and also in the Working Exemplification of the Invention, transparency measurements were made by determination of the absorbancy of specimens with regard to light having a 640 nanometer wave length. To do this, compression molded samples of the material whose transparency was desired to be tested, were employed, each of which had a molded thickness of approximately 10 mils. Each molded specimen to be light absorbancy-tested was placed in a special holder therefor in a Beckman (Type B) spectrophotometer, wherein its absorbance of 640 nm light from a standard source was determined. The special holder maintained the specimen being tested in a constant position at a distance of 6 centimeters from the back wall of the chamber in the spectrophotometer. The absorbance value taken was, when necessary, normalized to 10 mils in cases where the actual thickness of the sample deviated from this standardized dimension. For purposes of practical transparency evaluation(s), specimens tested that had an absorbance value below about 0.12 appeared clear and transparent to the unaided eye. Increasing absorbance values greater than about 0.12, indicate specimens which are more cloudy and relatively increasingly opaque to the unaided eye.

Polymethylmethacrylate has compatibility with various styrene-acrylonitrile polymers having copolymerized acrylonitrile contents of from 9 to 27 weight percent. See the above-noted French Pat. No. 1,526,375 as well as *Angew Makromol. Chem.*, 36, 89 (1974). FIG. 1 illustrates that transparent polyblends of polymethylmethacrylate and styrene-acrylonitrile polymer containing 24 weight percent acrylonitrile are produced which have refractive index values that are intermediate of those of the unmixed component polymer components in the compositions. For purposes of comparison, FIG. 1 also indicates the refractive index values of both styrene-butadiene and polybutadiene rubbers.

Figure 2:
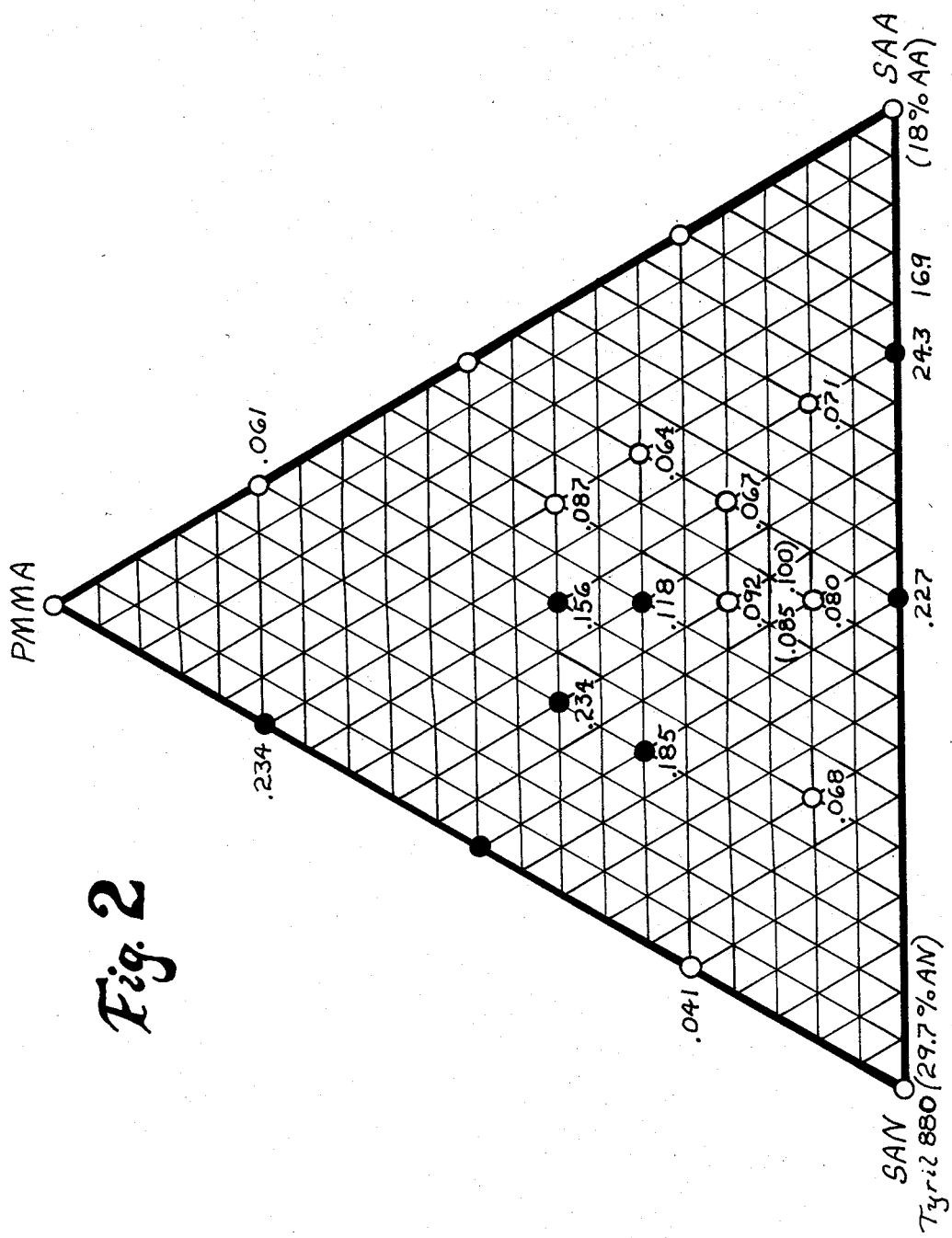

FIG. 2 is a ternary phase diagram indicating the transparency or lack therof in various polymethylmethacrylate polyblends, some of which are within and some without the scope of the present invention. Included are: (i) two-component polyblends of polymethylmethacrylate with a styrene-acrylonitrile copolymer containing 29.7 weight percent combined acrylonitrile (obtained from The Dow Chemical Company under the trade designation TYRIL 880); two-component polyblends of polymethylmethacrylate with a styrene acrylic acid copolymer containing 7.5 weight percent combined acrylic acid; and two-component polyblends of TYRIL 880 with the specified styrene acrylic acid copolymer; and (ii) three-component polyblends of the same polymethylmethacrylate with TYRIL 880 and the specified styrene acrylic acid copolymer. Compositions of the transparent polyblends are marked by open circles while those of the opaque products by solid circles.

FIG. 3 is a reproduction of electron microscope photographs which illustrate the intrinsic domain structures of two different polyblends of the same polymethylmethacrylate utlized for preparation of the ternary phase diagram of FIG. 2 (which was LUCITE 140 from E. I. duPont deNemours & Co., Inc.) with diverse styrene-acrylonitrile copolymers. The reproduction on the left-hand side of FIG. 3 is of an incompatible and opaque two-component polyblend of 25 parts by weight of LUCITE 140 and 75 parts by weight of a styrene-acrylonitrile copolymer containing 34.1 weight percent of combined acrylonitrile. It had an Izod Notched Impact value at 73° F. of 0.2 ft-lbs/in. The reproduction on the right-hand side of FIG. 3 is of a compatible and transparent (having a 640 nm absorbance value of 0.054) two-component 25:75 respective parts by weight polyblend of LUCITE 140 and TYRIL 760, a styrene-acrylonitrile copolymer containing 24.0 weight percent of combined acrylonitrile obtained from The Dow Chemical Company. Its Notched Izod Impact value, also at 73° F., was 0.3 ft-lbs/in.

Figure 4:
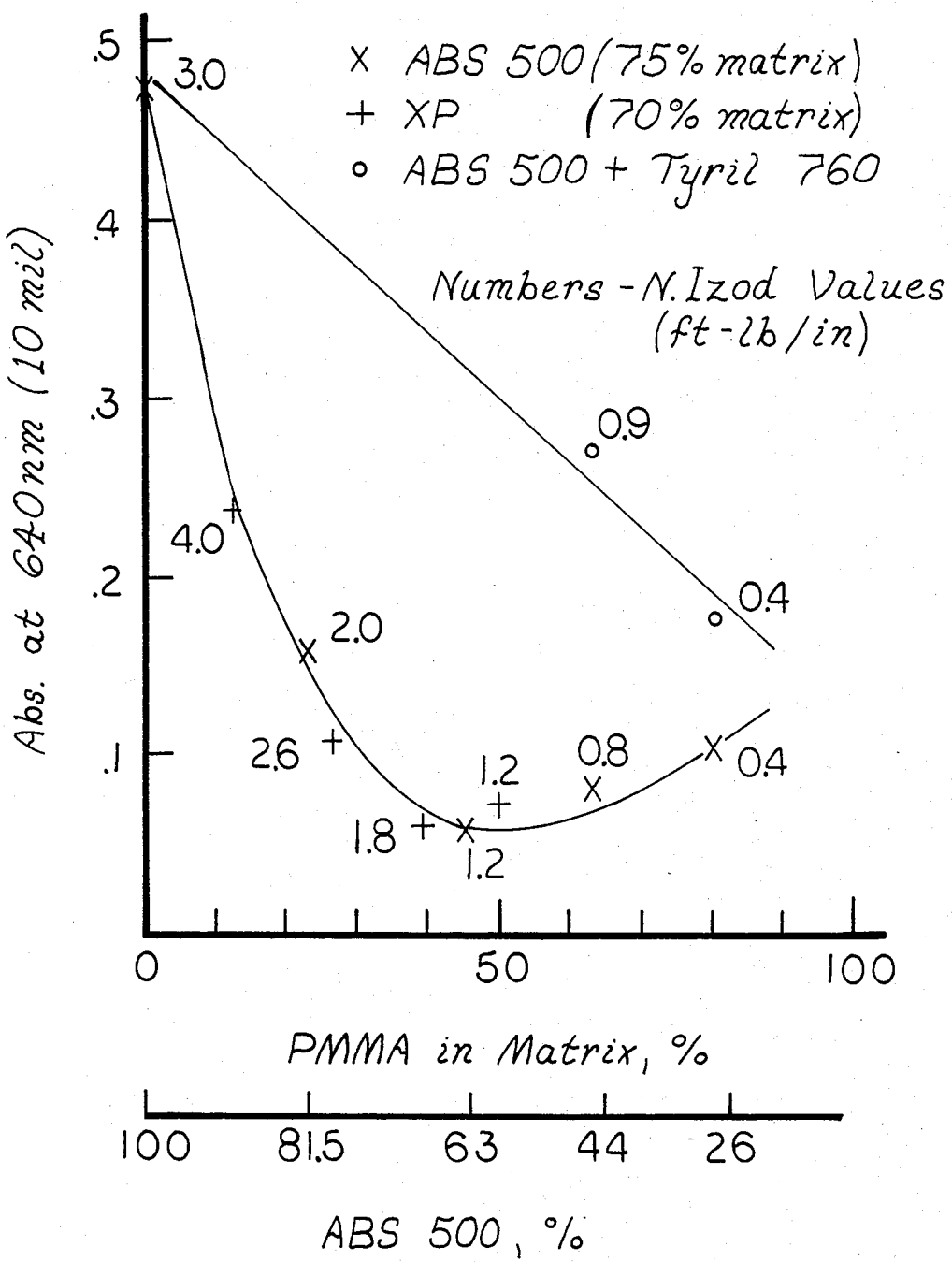

FIG. 4 of the Drawing shows the light absorbancy of various polyblends obtained by addition of LUCITE 140 to different acrylonitrile-butadiene-styrene resin compositions, including a mixture of an acrylonitrile-butadiene-styrene material with TYRIL 760 styrene-acrylonitrile copolymer. The ABS 500 material was obtained from The Dow Chemical Company and contained 13.5 weight percent polybutadiene type rubber with a soluble fraction containing 23.5 weight percent acrylonitrile. The XP resin was an acrylonitrile-butadiene-styrene material that contained 18 weight percent of polybutadiene rubber and a soluble fraction containing 24.4 weight percent of acrylonitrile. The ABS 500 resin was a mass-made material containing, typically, relatively large-sized rubber particles having styrene-acrylonitrile polymer occlusions within these particles that had sizes larger than about 0.1 micrometer. The XP material was an analogously-characterizable, mass-made acrylonitrile-butadiene-styrene product.

FIG. 5 is a reproduction of electron microscope photographs which show osmium tetroxide-stained specimens of: (a) on the left-hand side of FIG. 5 XP; and (b) on the right-hand side of the Figure, a respective 67:33 parts by weight transparent polyblend of XP and LUCITE 140. It is to be noted in FIG. 5 that the rubber particles in the XP/polymethylmethacrylate polyblend are not particularly distinguishable from those in the parent XP utilized for the two-component composition. The resulting transparency of the XP/polymethylmethacrylate polyblend is notably surprising when consideration is made of the fact that the styrene-acrylonitrile occlusions within these particles range to sizes that approach or are even as great as 0.5 micron, given the reasonable assumption that some degree of refractive index match is obtained between the composite matrix involved and the rubber particles when there are no styrene-acrylonitrile polymer occlusions present while, using an analogous reasonable assumption, it is hardly possible or anticipatable to observe a refractive index match between the matrix and such large styrene-acrylonitrile polymer occlusions.

Figure 6:
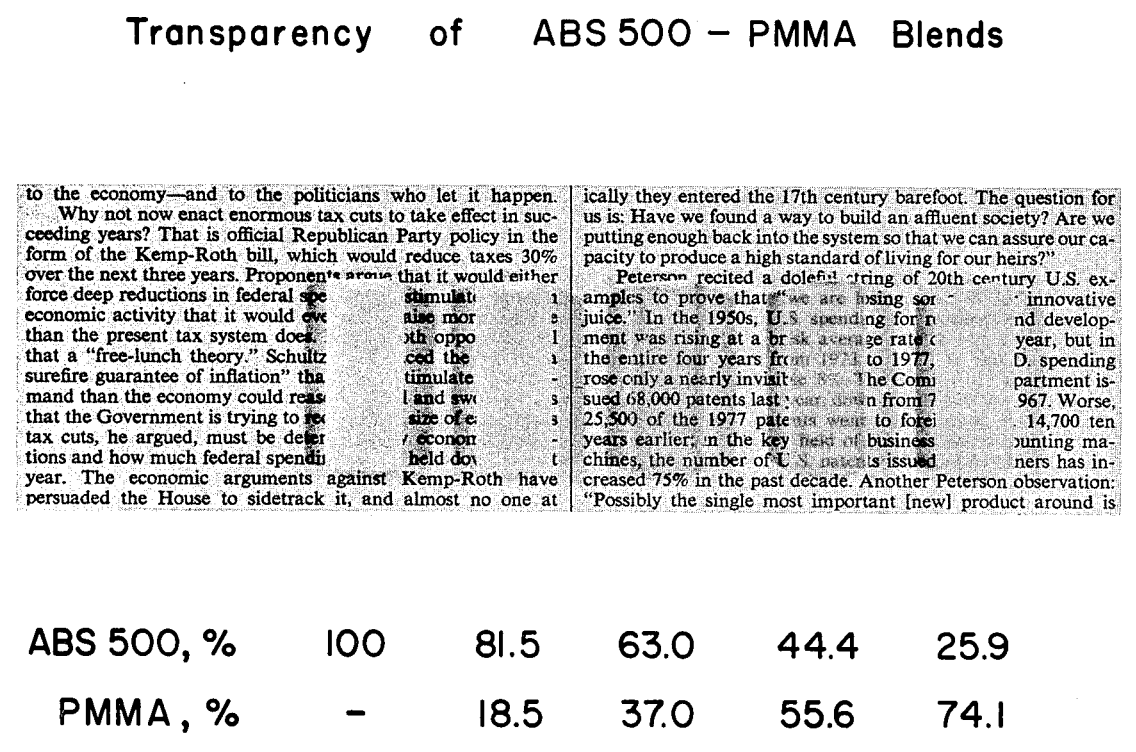

FIG. 6 is a reproduction of a photograph of an actual printed text having thereon superposed ⅛-inch thick compression-molded rectangles of various samples including unmodified ABS 500 and other polyblends (containing the indicated relative weight percentages of components) of ABS 500 and LUCITE 140, some of which were obviously outside the scope of the present invention. FIG. 6 illustrates that when the polymethylmethacrylate fraction of the polyblend is increased, to levels in the general 40 to 50 weight percent range, a much enhanced and surprising transparency is obtained. It is also noteworthy that with increasing polymethylmethacrylate in the mass-made acrylonitrile-butadiene-styrene polymer polyblend, tensile properties are generally enhanced. This is particularly so in respect of yield elongation, which is 3.0 percent at an included rubber content of 3.5 weight percent.

FIG. 7 of the Drawing graphically shows the effect of mixing time in the blending apparatus upon impact strength, shown by the lower curve with data points indicated by "x's", and transparency, shown by the upper curve with data points indicated by circles, of several increasingly-mixed samples of a two-component, 64:36 respective parts by weight polyblend of ABS 500 and LUCITE 140. FIG. 7 illustrates the benefit of thorough polymer blending and intimate admixture of the components in obtaining desired transparency.

WORKING EXEMPLIFICATION OF THE INVENTION

The following illustrative examples show the benefit of the present invention. In the examples, all parts and percentages are given on a weight basis and all temperature readings (unless otherwise specified) are in degrees centigrade.

FIRST ILLUSTRATION

A 25:75 polyblend of LUCITE 140 and a styrene acrylic acid copolymer containing copolymerized therein 7.5% acrylic acid was prepared from clear granules of the former and granules of the latter. This was done by physically combining the granular components followed by melting of the physical mixture on a 3×8 inch two-roll mill. The front roll of the mill was supplied with steam at 200–240 pounds per square inch gauge so that its surface temperature was maintained in the range of 160°–190° C. The back roll of the mill was not provided with steam. After melting of the mass, supplied to the mill, it initially appeared to be opaque and heterogeneous. After about 2 minutes of milling, however, the melt suddenly became clear. The roll-blending was continued for total time period of about 5 minutes.

A hot polymer blanket was removed from the rolls and subsequently compression molded into specimens for testing.

An analogous blend was prepared using a mixture of a copolymer of 91 percent methyl methacrylate and 9 percent AA in a 25:75 polyblend with the same styrene acrylic acid copolymer. The resulting polyblend was quite opaque.

The clear polyblend that was prepared in accordance with the present invention has: a Notched Izod Impact value of 0.23 ft-lbs/in; a Vicat Heat Distortion point of 116° C.; and a Melt Flow Rate under Condition "I" of 8.1 gms/10 min.

The opaque blend had the corresponding tested values of: 0.20 ft-lbs/in; 118° C.; and 14.1 gms/10 min.

SECOND ILLUSTRATION

The opaque polyblend formation of mixtures of polystyrene and polymethylmethacrylate is well known.

In order to investigate the lower practical limit of copolymerized acrylic acid in styrene acrylic acid copolymers in order to obtain transparent polyblends in mixtures thereof with polymethylmethacrylate, a series of experiments was run.

A number of styrene acrylic acid copolymers were made into different polyblends with LUCITE 140 polymethylmethacrylate. Each of the involved styrene acrylic acid copolymers had a weight average molecular weight in excess of about 200,000.

The actual polymer blendings were done for various time periods using a Brabender "Plasti-Cord" mixer with an associated bath temperature of 180° C. and a 63 revolutions per minute mixing speed.

The results obtained were as set forth in the following Table I.

TABLE I

Transparency Ratings of Various Polyblends of Styrene Acrylic Acid (SAA) and Polymethylmethacrylate (PMMA)

| Sample No. | % AA* In SAA | SAA/PMMA Ratio In Blend | Mixing Time (minutes) | Applied Torque (m-gms)[1] | Absorbancy Value |
|---|---|---|---|---|---|
| II-1 | 2 | 25:75 | 3 | 2190 | 1.090 |
| II-2 | 2 | 25:75 | 6 | 1780 | 1.136 |
| II-3 | 2 | 75:25 | 3 | 1640 | 1.713 |
| II-4 | 2 | 75:25 | 6 | 1385 | 1.548 |
| II-5 | 5 | 25:75 | 3 | 2110 | 0.064 |
| II-6 | 5 | 25:75 | 6 | 2020 | 0.061 |
| II-7 | 5 | 75:25 | 3 | 1870 | 0.107 |
| II-8 | 5 | 75:25 | 6 | 1630 | 0.078 |

*AA = acrylic acid
[1]m-gms = meter grams

In comparison, similarly prepared polyblends of STYRON 686 Brand polystyrene, obtained from The Dow Chemical Company and the same LUCITE 140 polymethylmethacrylate had measured absorbancy values of at least, and generally greater than 2 and were quite opaque in appearance to the naked eye.

THIRD ILLUSTRATION

To demonstrate the transparency enhancement obtainable with polymethylmethacrylate inclusions, a number of various blends of particular intimate two-component admixtures of styrene-acrylonitrile and styrene acrylic acid copolymers and three-component admixtures of polymethylmethacrylate with styrene-acrylonitrile and styrene acrylic acid copolymers were prepared and tested. The polyblending was done in general accordance with the procedure described in the foregoing Second Illustration. The results obtained were as set forth in the following Table II.

TABLE II

Transparency Ratings of Various Polyblends of Styrene-acrylonitrile (SAN) and Styrene Acrylic Acid (SAA) Improved in Certain Instances with Polymethylmethacrylate (PMMA)

| Sample No. | Composition %* PMMA | SAN | SAA | Absorbance |
|---|---|---|---|---|
| III-1 | 0 | 50 (24% AN[1]) | 50 (7.5% AA[2]) | 0.168 |
| III-2 | 0 | 50 (29.7% AN) | 50 (7.5% AA) | 0.227 |
| III-3 | 10 | 10 (24% AN) | 80 (7.5% AA) | 0.055 |
| III-4 | 20 | 40 (29.7% AN) | 40 (7.5% AA) | 0.083 |
| III-5 | 20 | 40 (34.1% AN) | 40 (7.5% AA) | 0.051 |

*Note: The parenthetical values indicate the percent of copolymerized designated monomer(s) in the identified copolymer(s).
[1]AN = acrylonitrile
[2]AA = acrylic acid

FOURTH ILLUSTRATION

It has been shown that certain polyblends of particular styrene-acrylonitrile copolymers having copolymerized therein 29.7 percent acrylonitrile and styrene acrylic acid copolymers having copolymerized therein 7.5 percent acrylic acid are opaque. To demonstrate that normally-opaque blends of these two diverse styrene copolymers are rendered transparent in polyblends thereof containing only relatively small inclusions therein of polymethylmethacrylate, a series of polyblends was prepared utilizing therein the various above-identified components in the proportions set forth with the transparency results obtained in the following Table III.

TABLE III

Transparency Ratings of Various Polyblends of Styrene-acrylonitrile Polymer (SAN) and Styrene Acrylic Acid Polymer (SAA) and Styrene-acrylonitrile Polymers and Polymethylmethacrylate (PMMA) and SAN/SAA/PMMA

| Sample No. | Composition Percent SAN | SAA | PMMA | Absorbance |
|---|---|---|---|---|
| IV-1 | 25 | 75 | 0 | 0.269 |
| IV-2* | 25 | 0 | 75 | 0.234 |
| IV-3 | 65 | 25 | 10 | 0.068 |
| IV-4 | 25 | 65 | 10 | 0.071 |

*Note: The composition of Sample IV-2 lies just outside the literature-reported range of compatibility for polyblends of styrene-acrylonitrile polymer and polymethylmethacrylate.

FIFTH ILLUSTRATION

Following the general procedure of the Second Illustration, another series of polymethylmethacrylate polyblends with 7 percent acrylic acid-containing styrene acrylic acid copolymers of differing molecular weights was prepared. In order to observe transparencies, blending times of the included polyblends were 3 and 10 minutes, respectively. In either event of involved mixing times, however, all of the resulting polyblended products were found to be transparent. Blending data are included in Table IV.

TABLE IV

Transparencies and Tensile Strength With Only 3 Minutes Mixing Time of Various 25:75 Styrene Acrylic Acid Polymer/Polymethylmethacrylate (SAA/PMMA) Polyblends

| Sample No. | $M_w$ of SAA | Applied Torque In Mixing (m-gms) | Tensile Strength (psi) | Absorbance |
|---|---|---|---|---|
| V-1 | 30,000 | 1420 | 2950 | 0.065 |
| V-2 | 60,000 | 1500 | 4300 | 0.078 |
| V-3 | 100,000 | 2425 | 4200 | 0.077 |
| V-4 | 150,000 | 2700 | 5500 | 0.048 |

Additionally, analogous 75:25 styrene acrylic acid/polymethylmethacrylate polyblends were prepared and found to be transparent after only 3 minutes of blending time in the Brabender mixer.

SIXTH ILLUSTRATION

A methyl methacrylate (60 percent)/styrene (40 percent) copolymer was polyblended in a 50:50 composition with a 7.5 percent acrylic acid-containing styrene acrylic acid copolymer. The resulting polyblend had a light absorbance value of 0.060.

SEVENTH ILLUSTRATION

A series of polyblends with polymethylmethacrylate (LUCITE 140) with ABS 500 was prepared according to the general procedure of the Second Illustration. As has been noted, the mass-made acrylonitrile-butadiene-styrene resin is opaque due to the relatively large size of the rubber particles contained therein. Unexpectedly, as is shown in Table V, polyblend samples thereof with LUCITE 140 polymethylmethacrylate became clear. Also set forth in Table V is data indicating replacement of the polymethylmethacrylate with a 24 percent acrylonitrile-containing styrene-acrylonitrile copolymer (Sample No. VII-4) produced an opaque polyblend.

TABLE V

Transparencies and Other Physical Properties of Various Acrylonitrile-Butadiene-Styrene Resin Compositions

| Sample No. | % ABS[1] | Tensile Rupture psi | Elongation, % | Modulus psi × $10^5$ | N.I.** ft-lbs/in | MFR*** gm/10 min | Absorbance |
|---|---|---|---|---|---|---|---|
| VII-1 | 100 | 4650 | 2.4 | 3.6 | 3.0 | 2.3 | 0.473 |
| VII-2 | 63 | 6000 | 2.7 | 4.1 | 1.2 | 2.9 | 0.057 |
| VII-3 | 44 | 6500 | 5.5 | 4.3 | 0.8 | 3.7 | 0.081 |
| VII-4 | 44* | 6000 | 1.7 | 4.4 | 0.9 | 10.3 | 0.270 |

[1]Balance PMMA
*SAN used in place of PMMA
**N.I. = Notched Izod
***MFR = Melt Flow Rate condition "I"

EIGHTH ILLUSTRATION

In further demonstration of the present invention, a series of LUCITE 140 polymethylmethacrylate polyblends with various mass-made and other, otherwise-prepared (and distinguishable from mass-made) acrylonitrile-butadiene-styrene resins were prepared and evaluated for 640 nm light absorbency and other physical properties. The results are as set forth in Table VI.

Of the acrylonitrile-butadiene-styrene resin-type materials included in the examples shown in the testing set forth in Table VI, additional to those previously described: ABS 213 was a relatively low rubber (polybutadiene)-containing mass-made acrylonitrile-butadiene-styrene obtained from The Dow Chemical Company, which contained 6.5 percent rubber with a soluble fraction containing 15.3 percent acrylonitrile; CYCLOLAC TD was a non-mass-made acrylonitrile-butadiene-styrene obtained from Borg Warner Corporation which has a soluble fraction containing 30.4 percent acrylonitrile; CYCOLAC GSE was also a non-mass-made acrylonitrile-butadiene-styrene resin obtained from Borg Warner Corporation, which had a soluble fraction containing 30.0 percent acrylonitrile; and LUSTRAN I-440 obtained from Monsanto Corporation, was likewise a non-mass-made acrylonitrile-butadiene-styrene resin which had a soluble fraction containing 29.2 percent acrylonitrile.

TABLE VI

Transparencies and Other Physical Properties of Various Acrylonitrile-Butadiene-Styrene (ABS) Resins and Polyblends Thereof with Polymethylmethacrylate (PMMA)

| Sample No. | Included ABS | % "LUCITE 140" PMMA In Polyblend | N.I. | MFR | Absorbance |
|---|---|---|---|---|---|
| VII-1 | "XP" | 0 | 5.8 | 4.4 | 0.476 |
| VII-2 | "XP" | 33 | 1.8 | 7.2 | 0.060 |
| VII-3 | "XP" | 44 | 1.2 | 7.5 | 0.073 |
| VII-4 | "ABS 213" | 0 | 2.0 | 5.5 | 0.536 |
| VII-5 | "ABS 213" | 40 | 0.6 | 5.2 | 0.080 |
| VII-6 | "CYCOLAC TD" | 0 | 5.0 | 8.3 | 0.793 |
| VII-7 | "CYCOLAC TD" | 44 | 0.5 | 11.2 | -high- |
| VII-8 | "CYCOLAC GSE" | 0 | 5.1 | 4.2 | 0.502 |
| VII-9 | "CYCOLAC GSE" | 44 | 1.1 | 7.9 | 1.18 |
| VII-10 | "LUSTRAN I-440" | 0 | 5.6 | 6.1 | 0.411 |
| VII-11 | "LUSTRAN I-440" | 44 | 1.1 | 8.4 | 0.679 |

From the foregoing, the advantages of operating in accordance with the present invention are apparent. Sample Nos. VII-6 through VII-11, inclusive, were non-transparent most probably because of their acrylonitrile content of greater than about 28 percent.

NINTH ILLUSTRATION

A three-component polyblend was made up following the general procedure of the Second Illustration using as its components: 33 percent of LUCITE 140 polymethylmethacrylate; 39 percent of ABS 500; and 28 percent of styrene-acrylonitrile-grafted polybutadiene rubber. The total rubber content of the polyblend was 20.1 percent. Its notched Izod impact strength was 1.3 ft-lbs/in; its melt flow rate was 0.9 grams/10 minutes Condition I; and its 640 nanometer light absorbance was 0.061 indicating excellent transparency.

TENTH ILLUSTRATION

The general procedure of the Second Illustration was again repeated to demonstrate preparing ternary polyblends of a 7.5 percent acrylic acid-containing styrene acrylic acid copolymer admixed with LUCITE 140 polymethylmethacrylate and ABS 500. In the preparation of each of the ternary polyblend batches, the styrene acrylic acid polymer and polymethylmethacrylate were first mixed on the rolls to achieve transparency, after which the appropriate amount of mass-made ABS 500 was added with compounding continued for an additional 5 minutes with frequent folding of the molten polymer blanket during the blending operation.

The results obtained are shown in Table VII, below.

TABLE VII

Transparencies of Various Styrene Acrylic Acid Resin (SAA), Polymethylmethacrylate (PMMA), Acrylonitrile-butadiene-styrene Resin (ABS) Ternary Polyblends

| Sample No. | Composition % | | | Absorbance |
|---|---|---|---|---|
| | SAA | "LUCITE 140" | "ABS 500" | |
| VIII-1 | 80 | 20 | 0 | 0.042 |
| VIII-2 | 72 | 18 | 10 | 0.081 |
| VIII-3 | 64 | 16 | 20 | 0.108 |
| VIII-4 | 48 | 12 | 40 | 0.185 |
| VIII-5 | 32 | 8 | 60 | 0.294 |

The results of operation pursuant to the invention in ternary polyblends is evident in the data of the above Table VII.

Desirable results are also obtained by making transparent polyblends of the same or different polymethmethacrylate resins utilizing varying styrene-acrylonitrile polymers and styrene acrylic acid resins and copolymeric equivalents thereof and/or differing acrylonitrile-butadiene-styrene and acrylonitrile-butadiene-styrene-type resins in place of those employed in the foregoing Illustrations but within the heretofore-disclosed composition parameters.

Many changes and modifications can readily be made and adapted in specifically altered embodiments in accordance with the present invention without substantially or materially departing from its apparent and intended spirit and scope, all in pursuance and accordance with same as it is set forth and defined in the hereto-appended claims.

What is claimed is:

1. Polyblended, organic thermoplastic polymers composition, transparent in visual perception by the unaided human eye, said composition being particularly characterizable in having a light absorbance value in the 640 nanometer wave length that is not greater than about 0.12 by standard test when said composition in a solid, shaped specimen form that has an at least substantially uniform thickness which at least approximates 10 mils is disposed and exposed perpendicularly to the path of a ray of said 640 nanometer wavelength light from a source thereof, said composition comprising, in intimate, thoroughly physically interdispersed admixture:

(a) polymethylmethacrylate in an effective, substantial quantity as an indispensable essential component in said polyblended composition; plus as additional polyblended component(s) in admixture with said polymethylmethacrylate component (a), a polymeric complement of:

(b) from 1 to about 99 weight percent, based on total composition weight of a copolymerizate of an alkenyl aromatic monomer and a monomeric vinyl acid containing polymerized in the copolymer molecule between about 95 and about 50 weight percent of the alkenyl aromatic monomer, said alkenyl aromatic monomer being of the Formula:

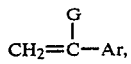
(I)

wherein G is selected from the Group consisting of hydrogen and methyl and Ar is an aromatic radical including alkyl and halo-ring-substituted aromatic units of from 6 to about 10 carbon atoms, said vinyl acid monomer being selected from the group consisting of acrylic acid, methacrylic acid, itaconic acid and mixtures thereof; and (c) from 0 to 70 weight percent of a mass-made acrylonitrile-butadiene-styrene-type resin that comprises:

from about 14 to about 28 parts by weight of a cyanoalkene of the Formula:

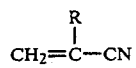
(III)

wherein R is selected from the Group consisting of hydrogen and a lower alkyl unit containing not more than about 4 carbon atoms therein;

from about 86 to about 72 parts by weight of an alkenyl aromatic monomer of the Formula (I); and between about 5 and about 18 weight percent of a natural or synthetic rubber ingredient, said rubber ingredient being in the form of particles having a weight average diameter range of from about 0.3 micron to about 5 microns having occluded styrene-acrylonitrile polymer therein;

with the formulation limitations attendant said polyblend composition that:

(i) when there is no quantity of component (c) in the polyblended composition, the weight percent of said component (b) therein present is at least about 1; and (ii) when both said component (b) and component (c) are present in the polyblended composition, the weight percent of said component (b) therein present is at least about 1 and the weight percent of said component (c) therein present is at least about 20.

2. The polyblended composition of claim 1, wherein the said component (b) compolymerizate contains at least about 75 weight percent of the Formula (I) monomer therein polymerized.

3. The polyblended composition of claim 1, containing at least about 10 weight percent of said interblended polymethylmethacrylate component (a).

4. The polyblended composition of claim 1, containing at least about 20 weight percent of said interblended polymethylmethacrylate component (a).

5. The polyblended composition of claim 1, containing at least about 40 weight percent of said interblended polymethylmethacrylate component (a).

6. A composition in accordance with claim 1 wherein said Formula (I) monomer is styrene.

7. A composition in accordance with claim 1 wherein the acid monomer is acrylic acid.

8. A composition in accordance with claim 1 wherein:
said component (c) is present in the composition;
said Formula (I) monomer is styrene;
said Formula (II) monomer is acrylic acid;
said Formula (III) monomer is acrylonitrile; and
said rubber ingredient in component (c) is polybutadiene.

9. A composition in accordance with claim 1 wherein:
said component (b) is present in the composition; and
said component (b) is a copolymer of styrene and acrylic acid.

10. A transparent shaped article fabricated from a composition that is in accordance with the compositions of claim 1.

11. A transparent shaped article fabricated from a composition that is in accordance with that of claim 6.

12. A transparent shaped article fabricated from a composition that is in accordance with that of claim 7.

13. A transparent shaped article fabricated from a composition that is in accordance with that of claim 8.

14. A transparent shaped article fabricated from a composition that is in accordance with that of claim 1.

* * * * *